Aug. 25, 1942.  E. F. FIOCK ET AL  2,293,725
ORIFICE COMPARATOR
Filed March 29, 1941.  3 Sheets-Sheet 1

INVENTOR
ERNEST F. FIOCK
MILTON H. de BRUIN
BY
ATTORNEY

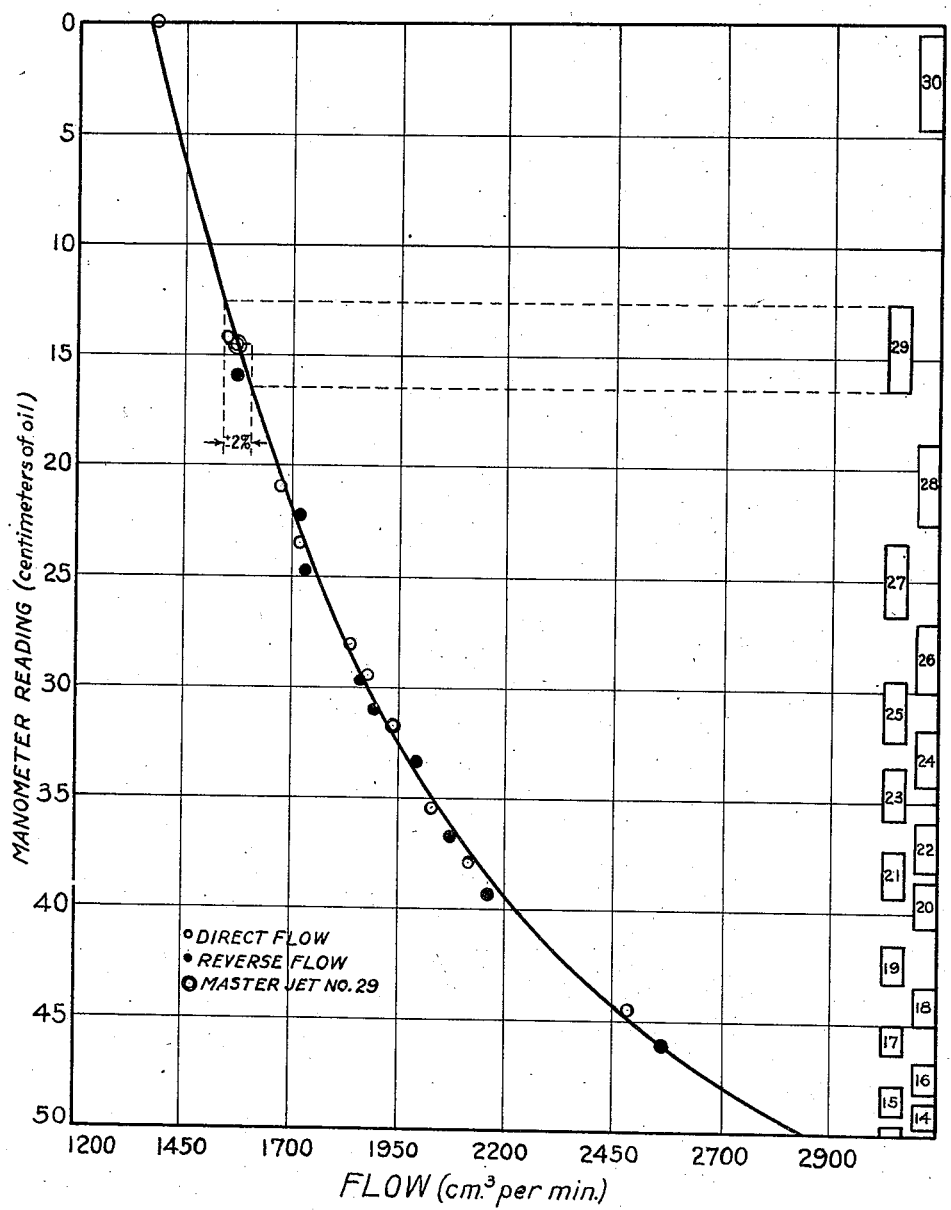

Aug. 25, 1942.  E. F. FIOCK ET AL  2,293,725
ORIFICE COMPARATOR
Filed March 29, 1941  3 Sheets-Sheet 3
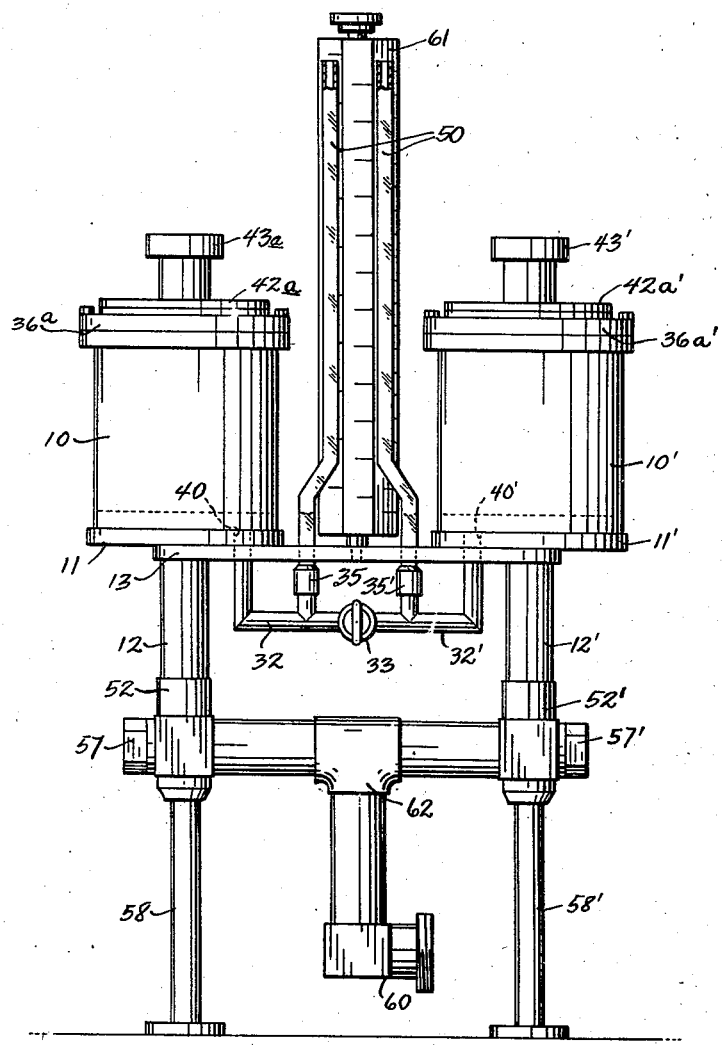
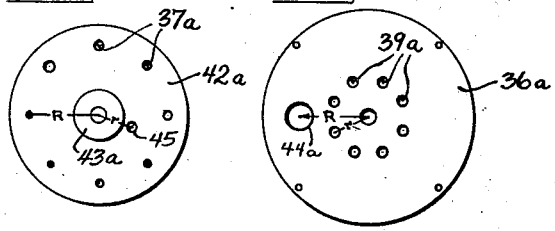
INVENTORS
Ernest F. Fiock
BY Milton H. de Bruin
ATTORNEY Patented Aug. 25, 1942

2,293,725

UNITED STATES PATENT OFFICE 2,293,725

ORIFICE COMPARATOR

Ernest F. Fiock, Chevy Chase, Md., and Milton H. de Bruin, Washington, D. C.

Application March 29, 1941, Serial No. 385,796

12 Claims. (Cl. 73—51)

(Granted under the act of March 3, 1883, as amended April 30, 1928; 370 O. G. 757)

This invention relates to an orifice comparator, or more specifically to a new and improved apparatus for flow testing of jets or orifices, particularly carburetor metering jets.

Prior to our invention carburetor metering jets were usually "flow tested" and "sized" by being subjected to actual flow tests, wherein the amount of liquid hydrocarbon fuel passing through a certain unknown jet under a constant head and for a pre-set period was determined; the jet, of course, being "sized" according to the amount of fuel passing therethrough. There are certain disadvantages in the use of this method which have been eliminated by our invention. For example, the data obtained by the actual flow test method is subject to personal error, since numerous readings or observations have to be made, and, furthermore, the accuracy of the test data is dependent somewhat upon the test period or number of readings taken. The greatest disadvantage accompanying the use of this prior art method is, however, the fire hazard which results from the use of the flammable hydrocarbon fuel as the testing fluid.

It is an object of our invention, therefore, to devise a means for testing carburetor jets by using a non-flammable, non-explosive fluid, instead of the flammable liquid hydrocarbons heretofore employed, whereby the fire hazards will be eliminated.

It is a further object of our invention to provide an apparatus for flow testing of carburetor metering jets using a fluid which is not only non-flammable but also inexpensive, uniform and readily available.

It is a still further object of this invention to provide an improved apparatus for flow testing of carburetor metering jets, wherein the time required to size an unknown jet, either new or used, is materially reduced, and the opportunities for personal error by the observer are minimized or substantially eliminated.

A more specific object of this invention is to provide an apparatus which will accurately and rapidly determine the amount of hydrocarbon fuel an unknown jet will flow in unit time by comparing it directly or indirectly with a jet of known characteristics.

It is also an object of our invention to provide an apparatus for testing carburetor jets with increased sensitivity and accuracy by eliminating the need for repeated observations on a single jet.

It is another object of this invention to provide an apparatus adaptable for testing carburetor jets for flow therethrough in either direction with equal rapidity, and with no mechanical changes other than the introduction and removal of the jets.

Since it has been established by experimental research that the features of a jet which govern the amount of liquid hydrocarbon flowing through it likewise govern the flow of air, we propose, therefore, to attain the first and second objects of our invention by devising an apparatus in which air may be used as the testing fluid.

In order to obtain the subsequent objects of our invention, we have provided an apparatus wherein two steady low pressure air streams of substantially equal volume may be obtained and each separately conducted to a comparatively large vessel serving the combined purpose of a manometric well and a mounting for a multiplicity of jets or orifices. The two low pressure air streams of substantially equal pressure head and equal volume of flow are obtained by directing a small supply of compressed air, subject to the manual control of a pressure regulating valve, into a small surge chamber having two symmetrically placed exit passages or orifices. These orifices are preferably, although not necessarily, of matched flow characteristics and serve two important functions. First, they divide the air stream admitted into the surge chamber into two paths of roughly equal volume, and second, they are so restricted that the air in passing therethrough will be "throttled" or "wire drawn" whereby the pressure at the exit will be materially lower than the pressure of the air in the surge chamber.

This low pressure air after being conducted to the two vessels is then allowed to escape to the atmosphere through a single outlet formed in each vessel comprising the jets whose flow characteristics are being compared. The pressure existing in each vessel is indicated on a separate manometer, open to atmospheric pressure at one end and filled with a suitable manometric fluid such as oil, attached to each vessel. Each vessel also contains the manometric fluid. These vessels constitute an important feature which has contributed to the accuracy obtainable by our invention, and has served also as a contributing factor in reducing the time required to size an unknown jet. By utilizing the lower part of each vessel as a well for its respective manometer, the well area being substantially greater than that of the indicating column, pressure gradients created in the vessels by variations in pressure of the gas supply and transient velocity heads also created in the vessels by turbulent effects of the gas are both minimized and have a negligible effect upon the manometer column since variations in the pressure of the fluid supplied to each vessel and transient velocity heads are integrated over the large area of the manometric fluid in each vessel instead of acting directly upon the relatively small manometer column. One of these vessels has as its sole gas exit a reference or "master" orifice with which a series of jets of known flow characteristics have been compared for calibrating the instrument. The other vessel has an unknown jet of equal or greater flow as its sole air outlet.

Another feature of our invention is that neither the exit orifices from the surge chamber nor the "master" orifices need to be made to any exact size. Neither is it necessary to know the flow characteristics of any of such orifices. All that is necessary is that such orifices do not change in flow characteristics after the calibration of the comparator. Thus, in service, the comparator does not require the use of matched orifices of any kind, a fact which is of great importance in the speed of operation as well as in the accuracy of the results.

The flow of air to the apparatus is regulated until the pressure in the vessel containing the master orifice has been adjusted to such a value as will bring the oil column to an arbitrarily chosen reference level near the top of its manometer tube. Since the unknown jet is larger than the master orifice, the pressure in its vessel is less than in the vessel containing the master orifice, and hence the oil column of its manometer tube is shorter than the oil column of the manometer tube attaching to the vessel containing the master orifice. The difference in the height of the two columns of oil is a measure of the difference in the flow characteristics of the master orifice and unknown jets. For purposes of making scales for the apparatus the aforesaid differential in oil level may be expressed in terms either of jet size (arbitrarily adopted numbers in terms of the present sizes of twist drills) or of actual flow of any fluid such as aviation gasoline of specified density. It is, therefore, apparent that with proper scales, the flow characteristic of an unknown jet may be accurately and rapidly determined by making a single observation on an appropriate manometer scale. Furthermore, the apparatus is provided with means whereby different unknown jets may be quickly brought into position for test, and whereby different fixed orifices and appropriate scales are readily brought into operating position. These provisions for changing the fixed orifices and scales widen the range of the apparatus, making possible the sizing of any jet that has been used in aircraft carburetors.

With the foregoing and other objects in view, the invention consists in the construction, combination and arrangement of parts hereinafter described and illustrated in the drawings, in which:

Fig. 4 is a typical reference curve plotted from data obtained from our device by comparing a plurality of orifices of known flow characteristics in the right hand vessel with a selected "master" orifice in the left hand vessel, and from which the flow characteristic of an unknown orifice may be readily and accurately obtained, as explained in detail hereinafter.

Fig. 5 is a front elevation of a modification of the device shown in Fig. 1.

Fig. 6 is a plan view of a modified cover plate; and,

Fig. 7 is plan view of a modified lid.

Figure 1:
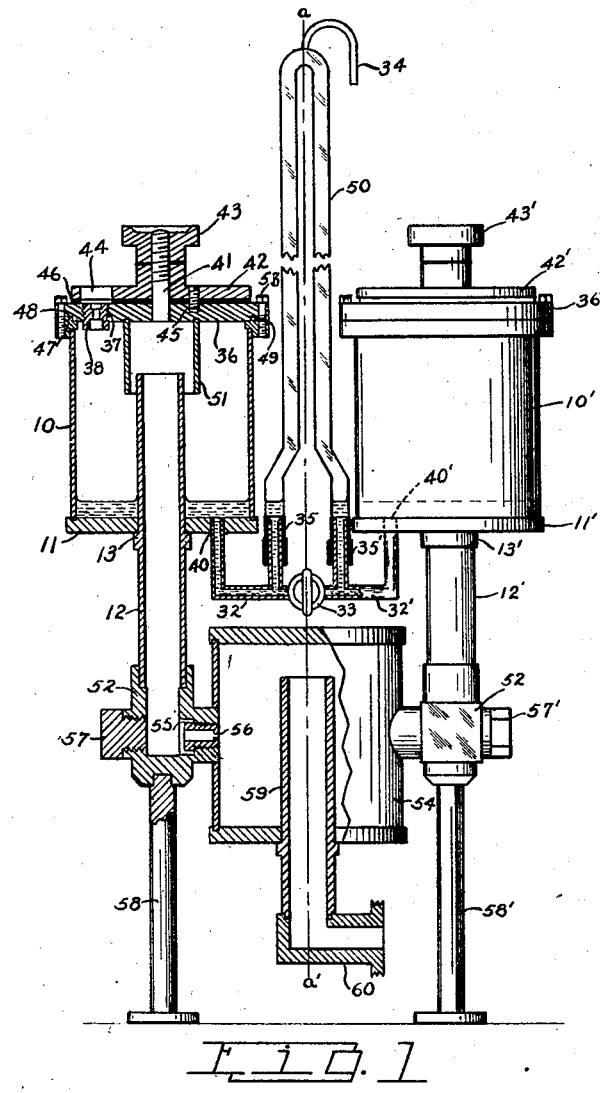
Fig. 1 is a front elevational view partly in cross-section of one form of our orifice comparator.

Referring now to Fig. 1 of the drawings, showing the essential features of a preferred embodiment of our invention, in which $a-a'$ is a longitudinal center line of the figure. The apparatus is symmetrical with respect to this center line, and while single reference numerals have been used to indicate corresponding parts, we prefer for the sake of clearness to designate the duplicate parts which lie to the right of the center line $a-a'$ by using primed reference numerals for those parts disclosed.

Figure 2:
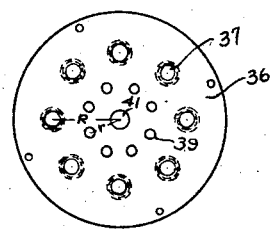
Fig. 2 is a plan view of a lid for one of the jet chambers.

Two identical vessels 10 and 10' are provided and each closed at the bottom with a supporting plate 11—11', which has a centrally located bore formed therein for receiving the tube 12—12' which is securely sealed to this plate. The tube is provided with a supporting shoulder 13—13', formed integrally therewith to aid in the support of the vessel. The vessels each contain a certain quantity of manometer fluid, such as water-white mineral oil, or the like, the level of which is considerable below the top of the tube 12—12' so as to prevent any oil from entering the tube. An outlet orifice 40—40' is drilled in each supporting closure plate 11—11' and a connecting pipe 32—32' is inserted therein. One end of each pipe is connected to an open end of a U shaped manometer tube 50 and the pipes are interconnected through an equalizing cock 33 so that the level of the manometer fluid in each chamber may be equalized. The closed end of the U shaped manometer tube has an open pipe 34 connected thereto so that each leg of the tube will be subject to atmospheric pressure only. The U tube is preferably made of Pyrex glass, the open ends of which are sealed to an end of the metallic pipe 32—32' by means of a wax joint indicated generally at 35—35'. Each vessel is provided with identical lids 36—36', the plan view of one of which is shown in Fig. 2. Eight equally spaced, tapped threaded holes 37 are machined in these lids, with the centers of each hole all disposed at an equal radius R from the center of the lid. In using the orifice comparator a plurality of different size master jets or main metering jets 38, may be screwed into the tapped holes 37 of lid 36 so that their ends are flush with the top surface of the lid. Similarly, a plurality of different sized unknown jets whose flow capacity is to be determined may also be screwed into the tapped openings formed in the lid 36'. Each lid is also provided with eight equally spaced machined pits 39, the centers of which are disposed at an equal radius $r$ from the center of the lid. As shown in Fig. 2, these pits 39 are positioned so that they lie midway between the tapped jet openings 37.

Figure 3:
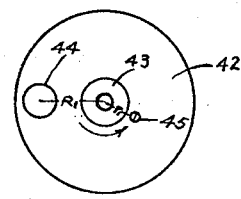
Fig. 3 is a plan view of a cover for said lids.

A centrally disposed stud member 41, is secured to each lid so as to be normal to its surface and to provide an axis about which a cover 42—42' may rotate. The upper portion of this stud is threaded to receive the knurled adjusting nut 43 by means of which the cover may be tightened or firmly pressed against the lid. An opening 44, Fig. 3, is drilled in each cover with its center positioned on a radius RI, equivalent to the radius of the tapped openings 37, so that as the cover is rotated about its axis this opening 44 will register with any single jet outlet. A tapped opening into which the locating pin 45 is threadably secured is machined in the cover with its center located at a radius rl from the center of the lid equivalent to the radius of the center of the pits 39, and is positioned so that the angle between the radii rl, Rl of the cover is equivalent to the angle formed by the radii drawn from the center of the lid to the center of a jet opening and to the center of one of said pits. Thus, when the pin 45 is located within one of the pits the opening 44 will register with a single jet outlet and the cover will be securely held in the position wherein the center of a jet opening in the lid and the center of said opening in said cover will coincide.

In order to prevent the escape of test fluid from any jet except those whose flow is being compared and uncovered by the opening 44 formed in the cover, an annular ring of soft sheet rubber or the like, 46, is shellacked or otherwise secured to the back of the cover. A hole is punched in this rubber sheet so as to completely uncover said opening 44. This sheet of rubber, or corresponding material, serves as a gasket which, when compressed by tightening the knurled adjusting nut 43, seals seven of the eight jet openings formed in each cover, but leaves an eighth jet outlet amply exposed to the atmosphere.

The top rim of each vessel 10, 10' is provided with an integrally formed flange 47 which seats in an annular groove 48 formed in the lid 36—36'. A gasket 49 of any suitable material is positioned within the groove so that as the lid is tightly clamped to the vessel by means of the screws 53 a gas-tight seal is formed at the junction of their respective surfaces. A suitable deflector tube 51 is also secured to the under side of each lid to protect the jet discharge from being subjected to a direct impingement of air or other testing fluid entering vessel 10—10' through the tube 12—12'.

A specially formed T connection 52 is sealed to each end of the tubes 12—12', preferably by being brazed thereto, while another end of the T is sealed into an opening formed in the side of a surge chamber 54. The internal diameter at this end of the T is less than that at the opposite end over a portion of its length and is threaded to receive the plug 55 which has a fixed opening 56 drilled therein. The opposite end of the T connection has a removable sealing plug 57 threadably secured thereto. The two flanged supporting legs 58, 58' are secured to the T connections by being recessed into the base of each to form a support for the entire assembly.

The surge chamber 54 has an opening formed at its base into which an inlet tube 59 is securely sealed. The opposite end of this tube has a flanged elbow union 60 secured thereto. This elbow union is adapted to be joined to the outlet leading from the test fluid supply source.

Preferably, each of the drilled openings 56, 56' are of equal flow characteristics so that the air stream admitted into the surge chamber by the inlet tube 59 may be divided into two parts of roughly equal volumes. Furthermore, these openings are suitably constricted so that the fluid admitted to the surge chamber 54 in flowing therethrough will be "throttled" or wire drawn to cause a reduction of the pressure in the tubes 12—12'. Without this reduction in pressure there would be little or no differential pressure in vessels 10—10'.

The details of the calibration of the apparatus and the evolution of a scale for the righthand manometer tube will now be described. A (number 31) carburetor metering jet which has been accurately tested to flow 1,376 centimeters per minute is arbitrarily chosen as a reference jet. This jet is secured into the lid 36 from its under side. Other jets of known flow characteristics, preferably master jets whose sizes range from a number 14 to number 30, are similarly placed in the lid 36' of chamber 10'. The cover plates 42, 42' are tightened in place so that the only exit from chamber 10 is via the reference jet (number 31), and the only exit from chamber 10' is via one of the jets of known flow characteristics.

The inlet pipe or tube 59 is connected to a compressed air source having a manually operated pressure regulating valve (not shown) in its supply outlet, by means of the flange elbow union 60. The valve is regulated until the oil column on the left is raised to an arbitrarily selected reference point near the top of the lefthand manometer tube. The righthand oil column which indicates the pressure prevailing in chamber 10' is then at a lower level, since the reference jet is smaller than any of the other jets of known flow characteristics. The difference in pressure prevailing in chambers 10, 10' expressed in centimeters of oil may be directly observed.

This process is repeated for all available jets of known flow in the range from number 30 up to about number 14. In each case the difference in pressure existing in the chamber 10' as compared with the constant pressure existing in chamber 10 is observed and recorded. These observed pressure differences as measured in centimeters of oil are then plotted against the known flow capacity of each jet which was used. The result of this plot is the curve shown in Fig. 4. The open circles are the observed pressure differences plotted against the actual flow data furnished with the jets of known characteristics.

A point on this curve represents the accepted flow for each master jet. For example, that for a number 29 master jet (flow 1,574 cubic centimeters per minute) is indicated by the large double circle in Fig. 4. Under present practice any jet flowing 1,574 cubic centimeters per minute ±2 per cent (that is 1,543 to 1,605 cm.³/min.) is acceptable as a number 29 jet. Hence, these limits are laid off horizontally from the large double circle and vertical lines were drawn from the termini to intersect the curve. The points of intersection of these lines were transferred horizontally to the right to form the corners of the block numbered 29. Thus, any jet causing the righthand oil meniscus to fall within this block, when the lefthand oil meniscus is at the same reference position as during calibration, is acceptable as a number 29 jet. A jet causing the oil meniscus to rise to the exact middle of the block has the exact same flow as a master jet, an oil level above the center of the block indicates that the jet flows less fluid than the master jet, and a jet larger than the master jet will produce an oil level below the middle of the block.

The calibration procedure is carried out as described above for jets of other sizes and with other master reference jets. A complete scale, good for a range of approximately 15 jets of consecutive size and number, is required for each master jet used as a reference.

It is usual for jets to have very different flow characteristics when the direction of flow is reversed. Jets may be tested for flow therethrough in the reverse direction in the apparatus which we have disclosed by inserting them, individually, from the top side of lid 36. Where this was done for the typical series of jets of which the open circles of Fig. 4 are for direct flow, the points indicated by the filled circles were obtained for flow in the reverse direction.

The fact that these solid circles lie so close to the calibration curve is indicative of the following facts, namely: that the same characteristics of the jet govern the flow of both air and liquid hydrocarbon, that the observed pressure difference with air, after proper calibration of the apparatus may be interpreted with certainty in terms of the amount of hydrocarbon which an unknown jet will flow, and that it is possible with this apparatus to flow test jets in either direction.

The height of the oil column on chamber 10 containing the reference jet can be readily held at the arbitrarily chosen height by manual control of a pressure regulating valve in the supply outlet. The height of either column of oil can be observed without difficulty to within a few tenths of a millimeter and these observations can be reproduced with the same precision as often as desired.

A plot of the blocks, as shown to the right in Fig. 4, may be used as a scale for the righthand manometer tube in testing jets when the main reference jet is a number 31 metering jet. Obviously, when different reference jets are used a scale for each jet must be provided, which is, of course, obtained by following the same procedure as outlined above.

It should be understood that we are not limited to this type of scale, since a scale may be obtained from the calibration curve to read the flow directly in volume of liquid fuel per unit of time. Variations of the operating temperature from the temperature at which the comparator is calibrated is of little consequence so long as the acceptance tolerance remains at ±2%.

The effect of such temperature variation is negligible when jets of approximately the same size are being compared, but increases as the difference between the jets becomes larger. For example, if the comparator, using a number 31 jet for reference, is operated at a temperature of 20° F. difference from the calibration temperature, an error of approximately 0.01 per cent will result in the observed flow through a number 29 jet, while there will be an error of 1.2 per cent in the observed flow of a number 14 jet against the same standard.

The use of a manometer fluid having a lower coefficient of thermal expansion than oil will reduce the effect produced by variations in temperature. Changes in atmospheric pressure will, however, have only a second order effect upon the results obtained, and are therefore entirely negligible.

We have illustrated and described a specific embodiment of our invention by means of which very accurate results can be obtained. In fact, the accuracy of this testing apparatus is sufficient to warrant a further possible future reduction in flow tolerances now allowed. However, it should be understood that we do not propose to be limited specifically to the details of the apparatus disclosed; in fact, it may be advisable to have the jets supported in the cover plate rather than in the lid, or a more convenient means for removing the lid may be provided. Furthermore, we do not wish to be limited to the eight jets disclosed, or particularly to the use of master metering jets, since they may be replaced with holes of precalculated dimensions machined either in the cover plate or lid.

Fig. 6 illustrates a modified cover plate 42a having a plurality of openings 37a of different diameters drilled therein.

Fig. 7 illustrates a modified 36a having an opening 44a for use with the cover plate in Fig. 6.

We have described a specific illustrated embodiment in which the reference jet is smaller than the unknown jet and have described the calibration of such an apparatus. It should be understood, however, that our invention is not so limited and the flow of a larger reference jet may be compared with the flow of a smaller unknown jet to determine its flow characteristics. In so operating the apparatus the height of the column of oil from the vessel bearing the larger known reference jets is adjusted to an arbitrary zero near the bottom of the scale, so that smaller jets of unknown flow characteristics may be calibrated by observing the height of the oil column attached to the other vessel. The height of the oil column will be higher than the oil column in the manometer secured to the vessel containing the larger known reference jet or orifice.

It is further obvious that means may be provided so that the proper scale for different reference jets may be quickly substituted. This may be accomplished as shown in Fig. 5 by pivotally mounting an octagonal tube 61 behind the manometers, each side of the octagon having a scale secured thereto, so that any one may be moved into proper position by manual rotation of the octagonal mounting.

It may be desirable in the interests of economy to reduce the size of the surge chamber as illustrated. In fact, the substitution of a streamlined T connection 62 such as illustrated in Fig. 5 may prove satisfactory. Further, while we have shown a U-shaped manometer tube 50, it is obvious that these tubes need not be joined at the top but may be separate as shown in Fig. 5 so that either may be replaced individually in case of breakage. It is obvious that other changes in the number and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

We claim:

1. In apparatus of the class described the combination comprising first and second containers each having a top closure member therefor, means in the top closure member of the first container providing a plurality of master orifices, means in the top closure member of the second container for securing a plurality of test orifices the flow characteristics of which it is desired to obtain, means cooperative with each of said top members for selecting any one of said master and test orifices respectively as gas outlet means for said containers, gas inlet means for said containers, baffle means within each container, said baffle means being positioned adjacent to the gas inlet means for preventing straight-line gas flow between inlet and outlet, a manometer connected to each chamber for indicating pressure therein, said manometers being operable independently of one another, means forming a manometer well in each container and including manometer fluid, means for supplying a gas under pressure to each container, gas inlet means whereupon the manometer columns will seek a differential in level dependent upon the difference in flow characteristics of the said selected master and test orifices respectively and scale means for measuring said differential, said scale being readable in terms of rate of fluid flow and calibrated by prior comparison of manometric level differentials utilizing a plurality of orifices of known flow-velocity characteristics in the second container and said selected master orifice in the first container.

2. In apparatus of the class described the combination comprising first and second chambers, gas inlet and outlet means for said chambers, the outlet means for said first chamber comprising a master orifice of fixed flow characteristic and the outlet means for said second chamber adapted to receive a test orifice, the flow characteristic of which it is desired to obtain, means providing a baffle within each chamber, said baffle means being positioned adjacent the gas inlet means for preventing straight-line gas flow between said inlet and outlet means, independently operable manometers connected to each chamber for indicating pressure therein, the lower portion of each said chamber forming a well for its respective manometer and containing manometer fluid, means for supplying gas under pressure to each chamber inlet means whereupon the manometer columns will seek a differential in levels dependent upon the difference in flow characteristics of the master and test orifices respectively and scale means for measuring said differential, said scale means being calibrated by prior comparison of manometer level differentials utilizing a plurality of orifices of known flow characteristic in the second chamber and said master orifice in the first chamber.

3. The combination of claim 2 characterized by the fact that said scale means is readable in terms of jet size.

4. The combination of claim 2 characterized by the fact that said scale means is readable in terms of flow per unit of time.

5. In apparatus of the class described the combination comprising first and second chambers, gas inlet and outlet means for said chambers arranged in off-set positions relative to each other, the outlet means associated with said first chamber comprising a master orifice and the outlet means associated with said second chamber being adapted to receive a test orifice of unknown flow characteristic, independently operable manometers connected to each chamber for indicating pressure therein, a lower portion of each said chamber forming a well for each said manometer and containing manometric fluid, means for supplying a gas under pressure to each chamber inlet means whereupon the manometers will seek a differential in levels dependent upon the difference in flow characteristics of the master and test orifices respectively and scale means for measuring said level differential, said scale being calibrated to read in rate of fluid flow by prior comparison of manometer level differentials utilizing a plurality of orifices of known flow characteristic in the second chamber and said master orifice in the first chamber.

6. The combination of claim 5 and including baffle means in each chamber for preventing straight line gas flow between gas inlet means and outlet means.

7. In apparatus of the class described the combination comprising first and second chambers, a gas inlet and a plurality of outlet means for each chamber, said outlet means for said first chamber comprising a plurality of master orifices of fixed flow characteristics and said outlet means for said second chamber adapted to receive a plurality of test orifices, the flow characteristic of which it is desired to obtain, means for selecting any one of said master and test orifices as gas outlets for said first and second chambers respectively, baffle means within each chamber, said baffles being positioned adjacent the gas inlet for preventing straight-line gas flow between inlet and outlet, a manometer connected to each chamber for indicating pressure therein, said manometers being operable independently of one another, means forming a manometer well in each chamber and including manometer fluid, means for supplying a gas under pressure to each chamber inlet whereupon the manometer columns will seek a differential in level according to the difference in flow characteristics of the said selected master and test orifices respectively and scale means for measuring said differential, said scale means being readable in terms of rate of flow and calibrated by prior comparison of manometer level differentials utilizing a plurality of orifices of known flow characteristics in the second chamber and said selected master orifice in the first chamber.

8. The combination in claim 7 including a surge chamber intermediate said first and second chambers and said gas supply, said chamber being provided with orifices connected respectively to the inlets of said first and second chambers for obtaining a substantial decrease in pressure of the gas passing therethrough.

9. In apparatus of the class described, the combination comprising first and second cylindrical casings each having top and bottom closure members therefor, means in the top closure member of the first casing providing a plurality of master orifices, means in the top closure member of the second casing adapted to receive a plurality of test orifices the flow characteristics of which it is desired to obtain, disc means cooperative with each of said top closure members, each disc including an aperture therein for selecting any one of said master and test orifices respectively as gas outlet means for said casings, gas inlet means for each casing comprising a tubular member projecting therein through the bottom closure member and concentric with said casings, baffle means disposed adjacent said gas inlets for preventing straight-line gas flow between inlet and outlet, a manometer connected to each casing for indicating pressure therein, said manometers being operable independently of one another, means forming a manometer well in each casing and including manometer fluid, means for supplying a gas under pressure to the gas inlet of each casing whereupon the columns of said manometers will seek a differential in level dependent upon the difference in flow characteristic of the said selected master and test orifices respectively and scale means for measuring said differential, said scale means being calibrated by prior comparison of manometer level differentials utilizing a plurality of orifices of known flow-velocity characteristics in the second casing and said selected master orifice in the first casing.

10. The combination of claim 9 characterized by the fact that said scale means is calibrated to read in terms of orifice size.

11. The combination of claim 9 characterized by the fact that said scale means is calibrated to read in terms of rate of flow.

12. In apparatus of the class described the combination comprising first and second chambers, gas inlet and outlet means for said chambers, the outlet means for said first chamber comprising a master orifice of fixed flow characteristic and the outlet means for said second chamber adapted to receive a test orifice, the flow characteristic of which it is desired to obtain, means providing a baffle within each chamber, said baffle means being positioned adjacent the gas inlet means for preventing straight-line gas flow between said inlet and outlet means, independently operable manometers connected to each chamber for indicating pressure therein, the lower portion of each said chamber forming a well for its respective manometer and containing manometer fluid, means for supplying gas under pressure to each chamber inlet means whereupon the manometer columns will seek a differential in levels dependent upon the difference in flow characteristics of the master and test orifices respectively and scale means for reading said differential, said scale reading being convertible into units of flow from data derived by prior comparison of manometer level differentials utilizing a plurality of orifices of known flow characteristics in the second chamber and said master orifice in the first chamber.

ERNEST F. FIOCK.
MILTON H. DE BRUIN.